United States Patent [19]
Levene

[11] 3,811,918

[45] May 21, 1974

[54] PROCESS FOR PRODUCING PROTECTIVE GLASS COATINGS

[75] Inventor: Leon Levene, Toledo, Ohio

[73] Assignee: Owens-Illinois, Inc., Toledo, Ohio

[22] Filed: Dec. 20, 1971

[21] Appl. No.: 210,104

[52] U.S. Cl............... 117/47 H, 65/60, 65/DIG. 14, 106/52, 106/54, 117/104 R, 117/121, 117/125, 117/129, 117/169 A
[51] Int. Cl...................... C03c 17/02, B32b 15/00
[58] Field of Search ... 260/448 AD, 46.5 R, 46.5 E; 117/121, 169, 125, 47 H, 104 R, 129; 65/DIG. 14

[56] References Cited
UNITED STATES PATENTS

| | | | |
|---|---|---|---|
| 3,477,868 | 11/1969 | Grundschaber | 117/129 |
| 3,640,093 | 2/1972 | Levene | 65/134 |

FOREIGN PATENTS OR APPLICATIONS

| | | | |
|---|---|---|---|
| 1,008,884 | 5/1957 | Germany | |
| 1,811,158 | 7/1970 | Germany | |
| 2,103,921 | 8/1971 | Germany | |
| 1,286,038 | 1/1969 | Germany | 106/52 |
| 1,941,191 | 1/1971 | Germany | |

OTHER PUBLICATIONS

H. Schroeder, "Oxide Layers Deposited from Organic Solutions" in Physics of Thin Films, Hass & Thun, eds. Vol. 5, 1969, Academic Press, pp. 87–122.
H. Schroeder, "Properties and Application of Oxide Layers..." in Optica Acta 9(3), pp. 249–254 (1962).
H. Dislich, "New Routes to Multicomponent Oxide Glasses" Augewandte Chemie, Vol. 10(6), June 1971, pp. 363–434.
H. Schroeder, "The Coating of Large Glass Surfaces..." in Glastech. Ber. Vol. 39(3), pp. 156–163 (1966).

*Primary Examiner*—William D. Martin
*Assistant Examiner*—William H. Schmidt
*Attorney, Agent, or Firm*—Robert F. Rywalski; Edward J. Holler

[57] ABSTRACT

A process for providing a silicate glass coated and protected inorganic substrate which comprises applying a substantially gel resistant, mineral acid stabilized, clear solution having a pH of less than about 1.5 of a substrate compatible glass composition in the form of a glass precursor onto the substrate and then heating the precursor to a temperature and for a time sufficient to convert the precursor into a silicate glass coating on the substrate. The precursor is prepared by hydrolyzing prescribed silicon alkoxides with less than a stoichiometric amount of water so as to prepare a clear solution of a partially hydrolyzed silicon alkoxide, which partially hydrolyzed silicon alkoxide solution is then reacted with an aqueous solution of a metal oxide forming compound so as to form a solution of the precursor or with a metal alkoxide so as to form a clear solution of a further hydrolyzable metallosiloxane, which latter clear solution of the further hydrolyzable metallosiloxane is then reacted with either a quantity of water sufficient to hydrolyze residual alkoxy groups or with an aqueous solution of a metal compound which is convertible to a metal oxide so as to form a solution of the glass precursor.

24 Claims, No Drawings

PROCESS FOR PRODUCING PROTECTIVE GLASS COATINGS

THE INVENTION:

This invention relates to a process for forming protective glass coatings on inorganic substrates, and more particularly, the invention relates to the formation of glass protective coatings by the application of a solution of a glass precursor.

In accordance with this invention there is provided a process for forming glass protective coatings on inorganic substrates by a process wherein a solution of a glass precursor is applied onto the substrate, after which time the glass precursor is heated to a temperature and for a time sufficient to convert the precursor into a glass. The glass precursor will, of course, be a precursor of a glass which is compatible with the substrate. More particularly, the process of this invention for providing a glass-coated and protected inorganic substrate comprises:

I. applying a clear solution of a substrate compatible glass precursor onto an inorganic substrate, wherein said solution is prepared by:
1. hydrolyzing a silicon alkoxide of the formula $SiX_nY_{4-n}$, wherein X is hydrogen, phenyl or alkyls of 1 to 6 carbon atoms, Y is OR where R is an alkyl of 1 to 6 carbon atoms and wherein n is 0 or 1 with less than a stoichiometric quantity of water in the presence of an effective catalytic amount of an acid hydrolysis catalyst so as to prepare a clear solution of a partially hydrolyzed silicon alkoxide,
2. reacting the partially hydrolyzed product according to the sequence of A plus B, A plus C, or B alone, so as to prepare said solution of a glass precursor,
   A. a metal alkoxide so as to form a clear solution of a soluble, further-hydrolyzable metallosiloxane,
   B. an aqueous solution of a metal compound which is convertible to a metal oxide so as to form said solution,
   C. a quantity of water sufficient to hydrolyze residual alkoxy groups in the metallosiloxane so as to form said solution,
II. heating said glass precursor to a temperature and for a time sufficient to convert same to a glass.

According to a highly preferred embodiment of this invention, alumina substrates are provided with smooth glass coatings by the aforementioned process and wherein the solution of the glass precursor is sprayed onto the alumina while the alumina is at an elevated temperature, with the temperature of the alumina and the rate of spraying being so selected so as to essentially prevent wetting of the alumina surface with the solution upon contact of the solution therewith; that is, in general, the spraying rate and the temperature will be so selected so that the solvent or volatiles in the spray solution substantially evaporate upon contact with said alumina, without any significant wetting of the surface, and leave a deposit thereon of the glass precursor.

In accordance with another feature of this invention, there is provided a process for providing an inorganic substrate with a protective glass coating which comprises:

I. applying a clear solution of a glass precursor onto said substrate, said precursor being prepared by 1. combining a silicon alkoxide of the formula $SiX_nY_{4-n}$, wherein X is hydrogen, phenyl or alkyls of 1 to 6 carbon atoms, Y is OR wherein R is an alkyl of 1 to 6 carbon atoms, and n is 0 or 1, with less than a stoichiometric quantity of water in the presence of an effective catalytic amount of an acid hydrolysis catalyst so as to form a clear solution of a partially hydrolyzed silicon alkoxide having residual OR groups,
2. reacting said clear solution of a soluble, partially hydrolyzed silicon alkoxide with a metal alkoxide so as to form a clear solution of a soluble, further hydrolyzable metallosiloxane,
3. reacting said clear solution of a soluble, further hydrolyzable metallosiloxane with an additional quantity of water, said additional quantity of water being sufficient to hydrolyze said further hydrolyzable metallosiloxane so as to form a clear solution, II. heating said precursor to a temperature and for a time sufficient to convert same to a glass.

According to a further feature of this invention, at least part of the additional water which is reacted in Step 3 is a water solution of a metal compound which decomposes to an oxide below about 600°C.

According to yet another feature of this invention, the hydrolysis catalyst can be present in an amount generally sufficient to provide a pH of between about 2-½ and about 5, i.e., about 2.5–5 and there is further contemplated adjusting the pH of the solution of step 3 to less than about 1-½, i.e., about 1.5 so as to provide a generally gel-resistant, stabilized solution for application onto the substrate.

According to a highly preferred aspect of this invention, there is provided a process for smoothing the surface of an alumina substrate; for example, alumina substrates having smoothnesses (or roughnesses) of 20 to 25 micro-inches or more, are provided with glass coatings having smoothnesses of less than about 3 or 4 micro-inches and, more typically, 1 to 2 micro-inches by a process which comprises: (1) spraying a clear solution in a solvent of an alumina-compatible glass precursor onto said alumina substrate while at an elevated temperature, said precursor being prepared by (1) reacting a silicon alkoxide of the formula $Si(OR)_4$, wherein R is an alkyl of 1 to 6 carbon atoms with about 0.3 to about 1.5 equivalents of water per equivalent of said silicon alkoxide at a pH of between about 2-½ and 5, i.e., about 2.5–5, so as to prepare a clear solution of a partially hydrolyzed silicon alkoxide, (2) combining said solution of a partially hydrolyzed silicon alkoxide with a metal alkoxide of the formula $M(OR')_x$, wherein M represents a cation, R' is an alkyl of 1 to 6 carbon atoms, and X is an integer dependent upon the valence of the cation, and allowing said combined ingredients to react so as to form a clear solution of a soluble, further hydrolyzable metallosiloxane having residual OR and OR' groups, (3) reacting said solution of a soluble metallosiloxane with a water solution of a metal compound which is convertible to a metal oxide, sufficient water being employed to react with said residual OR groups and OR' groups so as to obtain a clear solution, (4) adjusting the pH of said latter solution to between about one-half (½) and one, i.e., about 0.5–1, (II) heating said precursor to a temperature and for a time sufficient to convert same to a glass. In order to consistently provide for such highly improved, smooth surfaces, the elevated temperature and the rate of spraying will be so selected that essentially no wetting of the alumina takes place and so that the solvent substantially evaporates upon contact with the substrate, leaving a powder deposit thereon of the glass precursor. In a highly preferred aspect of this embodiment of the invention, the temperature of the alumina will be between about 150°C. to about 300° C.

As indicated hereinbefore, a silicon alkoxide of the formula $SiX_nY_{4-n}$ is hydrolyzed with less than a stoichiometric quantity of water in the presence of an effective catalytic amount of an acid hydrolysis catalyst, so as to prepare a clear solution of a soluble, partially hydrolyzed silicon alkoxide. That is, insufficient water to effect full hydrolysis will be employed. According to a highly preferred feature of this invention, a silicon alkoxide of that type is hydrolyzed with about 0.9 to about 1 equivalent (mole) of water per equivalent (mole) of silicon alkoxide. Generally, an excess of water should not be used so as to avoid interference with subsequent processing reaction. This, for example, may occur when an excess of a stoichiometric amount of water is employed; that is, for example, when $n$ is 0 in the above silicon alkoxide, two equivalents (moles) of water per equivalent (mole) of silicon alkoxide or an excess of two, should not be employed and, in fact, slightly lesser amounts may cause difficulties and when using a silicon alkoxide of the type indicated above, wherein $n$ is 1, excesses of about 1.5 equivalents (moles) of water per equivalent (mole) of silicon alkoxide should be avoided. Usually, in order to form the clear solution of the partially hydrolyzed silicon alkoxide, at least about 0.3 equivalents of water per equivalent of silicon alkoxide will be employed. According to a preferred embodiment, n in the silicon alkoxide described above will be 0 and about 0.3 to about 1.5 equivalents of water per equivalent of silicon alkoxide will be used.

Likewise, the hydrolyzing of the silicon alkoxide to form the clear solution of the partially hydrolyzed silicon alkoxide is preferably accomplished in the presence of a suitable acid hydrolysis catalyst, such as, for example, the mineral acids, including hydrochloric acid and nitric acid, or a Lewis acid catalyst, which comprises compounds of a transitional element, such as zirconium or titanium or compounds of a non-transitional element, such as aluminum. The hydrolysis catalyst will be employed in an effective catalytic amount, which amount generally will be about 1 to about 500 parts by weight per million parts by weight of the silicon alkoxide. Typically, hydrolysis is effected at a pH of between about two and one-half and five.

Inasmuch as the glass precursor, which, in essence, is a hydrolyzed and condensed form of siloxane or metallosiloxane, will be applied as a solution, it will be advantageous, especially when using a silicon alkoxide of the formula $SiX_nY_{4-n}$, wherein $n$ is 0, that the hydrolysis to form the clear solution of the partially hydrolyzed silicon alkoxide, be effected in the presence of an organic solvent. Suitable solvents may, for example, be mono, di, and tri-hydric alcohols, like the alkylene glycols, for example, ethylene or hexylene glycol and the like, including the mono-alkyl ethers of dihydric alcohols, cyclic ethers like dioxane and tetrahydrofuran, and other water-soluble, organic solvents, including for example, the $C_1$ to $C_6$ alkyl alcohols. The $C_1$ to $C_3$ alkyl alcohols, for example, ethanol, normal propanol, and isopropanol, are especially highly preferred. Additionally, it will be advantageous to select a relatively volatile solvent, such as a solvent which has a boiling point of about 300°C. or less, and preferably, 150°C. or less.

The metal component can be introduced into this process for forming a silicate glass precursor in the form of a metal alkoxide and/or metal compound which is convertible to a metal oxide. Metal, as used herein, is defined as comprising all of the metals listed in the Periodic Table, including the so-called metal-like elements, for example, the metalloids. It is preferred that the metal oxide forming components be added in the process as the alkoxide rather than as the salt, and, especially when it is desired to form an ultra-high-purity glass, it is preferred that the alkoxide employed be volatile and one which can be easily purified by distillation. Examples of metals which can be introduced in this way include Al, Ti, Ge, Zr, Hf, Th, V, Nb, Ta, B, Sn and P. Exemplary of the metal alkoxides contemplated for use in the present invention are metal alkoxides of the formula $M(OR')_x$ wherein X is an integer depending upon the valence of the cation M and R' is an alkyl of 1 to 6 carbon atoms. Other exemplary alkoxides include the double metal alkoxides generally of the formula $M_1 M_2 (OR)_x$, wherein $M_1$ and $M_2$ are metals, R is an alkyl of 1 to 6 carbon atoms, and wherein X is an integer dependent upon the combined valences of $M_1 M_2$; highly suitable double alkoxides include compounds of the formula $MgAl_2(OR')_8$ and $CaAl_2(OR')_8$, wherein R' is an alkyl of 1 to 6 carbon atoms.

The following metals, in general, do not form volatile alkoxides and it will be advantageous to add them in the form of metal compounds which are convertible to metal oxides and especially in the form of metal compounds which decompose to a metal oxide below a temperature of about 600°C., such as nitrates, acetates, or other salts of Li, Na, K, Rb, Cs, Cu, Mg, Ca, Sr, Ba, Fe, Co, Ni, Zn, Cd, Hg, Sc, Y, and rare earths La to Lu inclusive. The contemplated metal compounds, such as salts, are used in the form of an aqueous solution, and preferably include those soluble metal compounds or salts which decompose or are convertible to metal oxides below about 600°C. and which combine with the partially hydrolyzed silicon alkoxide and/or soluble, further hydrolyzable metallosiloxane to form a solution. In passing, it should be mentioned that the solutions as contemplated in the present invention are clear; it will, of course, be apparent that other materials may be added, for example, adjuvants which are not soluble in the system, but this will not change the essential nature of the clear solutions employed in this invention. Suitable metal compounds which may be employed include metal halides but metal nitrates and metal acetates are especially highly preferred when it is desired to form a high purity glass. Other suitable salt solutions are those containing soluble salts of organic acids, including benzoic acid or other aromatic acids, or fatty acids, alcohol acids, vinyl acids, oxalic acids. Suitable soluble salts of organic acids include salts of formic, citric, propionic, tartaric, although acetic acid is especially highly preferred. In general, the aliphatic acids having from 1 to 20 carbon atoms and the aromatic acids having from 7 to 15 carbon atoms, are quite suitable.

The specific ingredients employed to produce the silicate glass precursor solution will be routinely selected by those skilled in the art so as to provide a composition, based on equivalent oxide contents of the ingredients, which will form a suitable glass. The selection of the glass, of course, will depend on various factors, largely governed by the desired end usage. The two governing considerations are that the composition selected will be compatible with the substrate, that is, there will be no adverse interaction between the two, and also, the glass will be so selected so as to have a thermal coefficient of expansion sufficiently close to that of the substrate so as to minimize difficulties in this respect. Additionally, it will generally be preferred to use glasses having low softening points, for example, softening points of less than about 620°C. and with viscosity characteristics such as to allow them to flow into a uniform layer upon the substrate within a reasonable period of time. Among other glasses which will be routinely selected by those skilled in the art, aluminosilicate, borosilicate, aluminobrosilicate, alkaline-earth aluminoborosilicate, alkali alkaline-earth aluminosilicate, and especially, lithia alkaline-earth aluminosilicate glasses, are quite suitable, as are alkaline earth titania aluminosilicates and alkali alkaline-earth aluminoborosilicate glasses.

The substrates which are coated by the application of the solution of the glass precursor as contemplated herein are any of the inorganic substrates. These substrates include glass, ceramics, metals and glass-ceramics. It will be found that in practicing the method of this invention, smooth, uniform glass coatings can be provided having thicknesses of less than about two mils and, more typically, thicknesses of between about 0.5 to about 1 mil with surface smoothnesses of less than about 3 or 4 micro-inches, and more typically, between 1 and 2 micro-inches. When attempting to attain such smoothnesses by using other techniques, it will be found that the thicknesses required to produce such smoothnesses will be substantially higher than those required in the present invention. It will, therefore, be apparent that substantially less material need be used, with corresponding economic benefits being realized, by the practice of this invention. Additionally, the practice of this invention provides for a glass precursor which can be converted to a homogeneous glass under conditions of time and temperature which are substantially less than those required using conventional melting techniques.

In copending application, U.S. Ser. No. 843,777, now U.S. Pat. No. 3,640,093, there is disclosed a process wherein solutions are obtained, by hydrolysis and condensation reactions, which solutions are then allowed to gel and the gel then heated, or thermally degraded, to an oxide product which may then be converted to a glass. The present invention contemplates the general technique disclosed in this pending application but, as hereinbefore indicated, a solution is employed according to the present invention, in contrast to forming a gel, as set forth in Ser. No. 843,777, now U.S. Pat. No. 3,640,093. That is, the solutions produced by the technique of that application, prior to allowing them to gel, may be used herein. Typically, those solutions have pH values ranging between about 2.5 and 5. Inasmuch as these solutions with these pH ranges, however, will gel after a short period of time, it is preferred, as contemplated in the present invention, to adjust the pH of the solutions with an effective solution-stabilizing amount of an acid. When so adjusted, the solutions are gel resistant and stable for weeks, and even months. Thus, in accordance with the present invention, after the solutions have been formed, for example, as contemplated in pending application 843,777, now U.S. Pat. No. 3,640,093, and prior to the formation of the gel, there is added to the solution, for purposes of adjusting the pH, an acid, which acid, for example, will preferably be a strong mineral acid, such as, for example, nitric acid, hydrochloric acid, sulfuric acid, or the like, with nitric acid being preferred. Usually, the acid will be added in an amount sufficient to adjust the pH to less than about 1½ (1.5) and, preferably, adjust the pH to a range of about ½ to about 1 (about 0.5–1). Satisfactory results will also be obtained by initially using an amount of acid hydrolysis catalyst so as to provide a pH of less than about 1.5.

As hereinbefore indicated, inasmuch as the present invention contemplates the application of a solution of the glass precursor, it will be convenient to effect the wet chemical hydrolysis and condensation reactions in the presence of an organic solvent. It will be desirable to select the proportions of the various ingredients so as to produce a solution of the glass precursor based on the total weight of said precursor's theoretical oxide glass composition at a concentration of about 5 to about 20 percent by weight. Preferably, the ingredients will be so selected as to produce about a 10 percent solution of the solute glass precursor based on the total oxide weight of the precursor's theoretical glass composition.

The solution of the glass precursor may be applied onto the substrates in any convenient manner, such as, for example, flow coating, brushing and dipping. However, when it is desired to form a thin, glass coating on the substrate, for example, a coating of less than about 2 or 3 mils, and more typically about ½ to 1 mil, which glass will have an extremely smooth surface, for example, a smoothness of 3 micro-inches and, more typically, 1 to 2 micro-inches, the solution will be applied by a spraying technique using any form of conventional spray means. In this embodiment, however, the substrate which is to be provided with the glass coating will be at an elevated temperature; the temperature and the rate of spray application will be so selected that, upon contact with the heated substrate, the volatiles, or solvent for the glass precursor, will substantially evaporate upon contact with the heated surface and, essentially, prevent any wetting of the surface. Of course, it will be apparent that if the temperature and rate are improper, the rate of evaporation, or volatilization, upon contact with the surface can cause a violent, turbulent release of the vapors, which vapor release can prevent the precursor from attaching to the surface or even removing some that has already been attached thereto; thus, the parameters will likewise be so adjusted as to prevent this undesirable effect; otherwise, no coating will be realized. Excellent thin, uniform glass coatings generally are obtained by heating the substrate to a temperature between about 150°C. and about 300°C., 200°C. being highly preferred, with the rate of spray application being adjusted as indicated above. In passing, it should be mentioned that during the hydrolysis and condensation reactions, alkanol by-product is released, as a result of the hydrolysis of the alkoxide groups with water and water is then released during condensation reactions; it will generally, therefore, be quite convenient to use an alcohol solvent, to produce the desired solution concentration corresponding to the alkanol which is released as the result of the hydrolysis reaction. In a preferred embodiment, the silicon alkoxide is tetraethoxysilane and the solvent employed will be ethanol.

After the solution has been applied to the substrate, as indicated above, there will remain a uniform deposit in the form of a powder of the glass precursor, which deposit is then heated to a temperature and for a time sufficient to convert it into a homogeneous glass product. Most desirably, and especially with alumina substrates, the substrate with the powder deposit will be introduced into a preheated furnace. Those skilled in the art will routinely select these temperatures and times.

The following is presented in order to enable those skilled in the art to more easily make and use the present invention and also sets forth the best mode contemplated in making and using the present invention. It is to be understood, however, that this is merely exemplary and is not to be construed as limiting the invention. In the examples that follow, a standard commercially available alumina substrate was employed, which had a surface smoothness or, perhaps more accurately, roughness, of 20 to 25 micro-inches as measured by a Clevite Brush Surfanalyzer 150. It is well known in the micro-electronics industry, wherein alumina substrates are extensively employed, that it is necessary for certain applications to provide them with a smooth protective coating in order that they may be used for their ultimate purposes such as, for example, a base for microcircuitry.

EXAMPLE 1

A solution of a glass precursor was prepared according to the following procedure: tetraethoxysilane (32 grams), ethanol (30 grams), water (2.8 grams), and 4 drops of 1 N HCl were intimately combined and heated to a temperature of about 70°C. and held at that temperature for about 15 minutes. The heating was done to assist in the rate of hydrolysis and after this period of time, there remained a clear solution of a partially hydrolyzed tetraethoxysilane. To this warm solution there was then added 12 grams of aluminum secondary butoxide, which also resulted in the formation of a clear solution with the evolution of heat. This solution contained a soluble, further hydrolyzable metallosiloxane and, more accurately, an aluminosiloxane. In a simplified fashion the reaction may be thought of as proceeding along the lines:

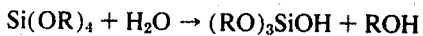
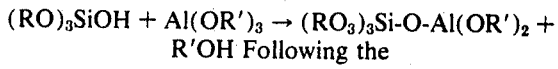

$$Si(OR)_4 + H_2O \rightarrow (RO)_3SiOH + ROH$$
$$(RO)_3SiOH + Al(OR')_3 \rightarrow (RO_3)_3Si\text{-}O\text{-}Al(OR')_2 + R'OH \text{ Following the}$$

Following of this clear solution, there was then added 4.5 grams of boric oxide dissolved in about 10 grams of methanol, followed by the addition of a solution of BaCl$_2$·2H$_2$O (13.9 grams) and 40 grams of water. There remained a clear (pH of about 3–4) solution of a glass precursor having the theoretical glass oxide compositional analysis set forth immediately hereinafter in weight percent. The concentration based on the glass oxide composition was about 10 percent by weight.

| | |
|---|---|
| SiO$_2$ | 37% |
| Al$_2$O$_3$ | 10% |
| BaO | 35% |
| B$_2$O$_3$ | 18% |

This solution was immediately employed and was sprayed onto an alumina substrate which had been previously heated to a temperature of about 200°C. The spraying rate was so selected that the volatiles of the solution substantially evaporated immediately upon contact with the substrate, leaving a fine white deposit of the glass precursor. The alumina substrates having the glass precursor applied thereto were subjected to various temperatures and times in order to convert the glass precursor to a homogeneous glass. In all cases, the alumina substrates with the precursor deposits were introduced into a preheated furnace. The temperatures employed generally ranged between about 1,100°C. to about 1,260°C. and the times varied between about 15 seconds to 90 seconds.

Additionally, at the more severe ends of these time and temperature heatings, that is, at the higher temperature and in the longer time intervals, it was noted that there was a slight tendency of the glass to permeate into the alumina; the same tendency was noted when a preheated furnace was not employed, i.e., when the substrates were positioned in a furnace at room temperature and the furnace then heated to the temperatures noted. Excellent, highly smooth glass coatings, these coatings having smoothnesses between about 1 and 2 micro-inches, were obtained by heating for about 30 seconds at temperatures of about 1,230°C. The thicknesses of the glass coatings were generally between about ½ to about 1 mil.

EXAMPLE 2

Following the procedure of application Ser. No. 843,777, now U.S. Pat. No. 3,640,093 the solutions of the glass precursors as manufactured in Example 1 were allowed to gel, which gel was then heated to produce a solid oxide product, sub-micron in size. This product, which was dispersed in a mixture of 95 percent isoamylacetate (containing 1.2 percent nitrocellulose) and 5 percent methanol to about 10 percent concentration, when sprayed onto the substrates in the manner indicated above produced final glass coatings which were inferior to the coatings produced by employing the use of the solution. That is, by practicing the gel teachings of Ser. No. 843,777, now U.S. Pat. No. 3,640,093, and employing the small particle product, equivalent smoothnesses could not be obtained at thicknesses in the range of about ½ to 1 mil but, typically, required thicknesses on the order of four times these thicknesses. It will thus be apparent that substantially more material will be required if the solution technique of the present invention is not employed.

The same glass composition prepared by conventional melting techniques when ground to a small particle size (−325 mesh) and sprayed as described immediately above produced unsatisfactory final glass coatings. Thin coatings could not be obtained and smoothness was about 38 micro-inches.

EXAMPLE 3

Inasmuch as the solution as produced in Example 1, which generally has a pH of between about 3 and 4, will gel after short periods of time, there was added to the solution of the glass precursor a gel-resisting, solution-stabilizing amount of an acid. In this specific instance, to the solution there was added a sufficient amount of concentrated nitric acid to adjust the pH to a level between about 0.5 and 1. The solution, which is now stabilized against gelling, was then employed in the manner of Example 1 with excellent, smooth (1 to 2 microinches) glass coatings being produced on alumina with thicknesses of about ½ to 1 mil when the substrate with the glass precursor was heated between about 15 and 30 seconds at a temperature of about 1,630°C.

EXAMPLE 4

The procedure of Example 1 is repeated except that instead of using 4 drops of HCl, sufficient HCl is added to produce a pH of about 0.5. The solution of the glass-precursor having a pH of about 0.5 produces substantially the same results when used as set forth in Example 1.

While the invention has been described above, modifications may be made, which, pursuant to the patent statutes and laws, do not depart from the spirit and scope of the present invention.

I claim:

1. A process for providing a silicate glass coated and protected inorganic substrate which comprises:
   I. applying a substantially gel resistant, mineral acid stabilized clear solution, having a pH of less than about 1.5, of a substrate-compatible glass composition in the form of a glass precursor onto said substrate, said solution being prepared by:
      1. hydrolyzing a silicon alkoxide of the formula $SiX_nY_{4-n}$, wherein X is hydrogen, phenyl or an alkyl of 1 to 6 carbon atoms, Y is OR where R is an alkyl of 1 to 6 carbon atoms and wherein $n$ is O or 1, with a quantity of water less than the stoichiometric amount required for total hydrolysis of the alkoxide radicals in the presence of an effective catalytic amount of an acid hydrolysis catalyst so as to prepare a clear solution of a partially hydrolyzed silicon alkoxide;
      2. reacting the partially hydrolyzed silicon alkoxide with a metal alkoxide so as to form a clear solution of a soluble, further hydrolyzable metallosiloxane;
      3. reacting said clear solution of a soluble, further hydrolyzable metallosiloxane with an aqueous solution of a metal compound which is convertible to a metal oxide below about 600°C. so as to form a clear solution of said glass precursor;
   II. heating said glass precursor to a temperature and for a time sufficient to convert same to a silicate glass coating on the inorganic substrate.

2. The process of claim 1 wherein the silicon alkoxide is hydrolyzed with at least about 0.3 equivalent of water per equivalent of silicon alkoxide and wherein said metal compound is a metal salt of an organic acid or of nitric acid.

3. The process of claim 2 wherein $n$ in said silicon alkoxide is O and wherein the hydrolysis is effected with about 0.3 to about 1.5 equivalents of water per equivalent of silicon alkoxide, and wherein said hydrolysis is done in the presence of an organic solvent.

4. The process of claim 3 wherein the silicon alkoxide is tetraethylsilicate.

5. The process of claim 3 wherein said substrate is an alumina substrate.

6. The process of claim 5 wherein said applying is done by spraying said substrate while at an elevated temperature, said temperature and the spraying rate being so selected so as to essentially prevent wetting of the surface of said substrate.

7. The process of claim 3 wherein said applied solution contains said glass precursor in a concentration of about 5 to about 20 percent by weight based on the total weight of said precursor's theoretical oxide glass composition.

8. The process of claim 7 wherein said glass composition consists essentially of, on a theoretical oxide basis, about 37 percent $SiO_2$, about 10 percent $Al_2O_3$, about 35 percent BaO, and about 18 percent $B_2O_3$ by weight.

9. The process of claim 1 and further including adjusting the pH of the clear solution of said glass precursor, as formed after said reaction with said aqueous solution of a metal compound, with a mineral acid to a pH of less than about 1.5.

10. The process of claim 9 wherein said mineral acid is nitric acid.

11. A process for providing a silicate glass coated and protected inorganic substrate which comprises:
    I. applying a substantially gel resistant, mineral acid stabilized clear solution, having a pH of less than about 1.5, of a substrate-compatible glass composition in the form of a glass precursor onto said substrate, said solution being prepared by:
       1. hydrolyzing a silicon alkoxide of the formula $SiX_nY_{4-n}$, wherein X is hydrogen, phenyl or an alkyl of 1 to 6 carbon atoms, Y is OR where R is an alkyl of 1 to 6 carbon atoms and wherein $n$ is O or 1, with a quantity of water less than the stoichiometric amount required for total hydrolysis of the alkoxide radicals in the presence of an effective catalytic amount of an acid hydrolysis catalyst so as to prepare a clear solution of a partially hydrolyzed silicon alkoxide;
       2. reacting the partially hydrolyzed silicon alkoxide with a metal alkoxide so as to form a clear solution of a soluble, further hydrolyzable metallosiloxane;
       3. reacting said clear solution of a soluble, further hydrolyzable metallosiloxane with an additional quantity of water sufficient to hydrolyze residual alkoxy groups in the metallosiloxane so as to form a clear solution of said precursor;
    II. heating said glass precursor to a temperature and for a time sufficient to convert same to a silicate glass coating on the inorganic substrate.

12. The process of claim 11 wherein said applied solution has a pH of between about 1.5 and about 1.

13. The process of claim 11 wherein the pH of the solution of said glass precursor after reaction with said additional quantity of water is between about 2.5 and about 5 and further including the step of adjusting said pH to less than about 1.5.

14. A process for providing a silicate glass coated and protected inorganic substrate which comprises:

I. applying a substantially gel resistant, mineral acid stabilized clear solution, having a pH of less than about 1.5, of a substrate-compatible glass composition in the form of a glass precursor onto said substrate, said solution being prepared by:
  1. hydrolyzing a silicon alkoxide of the formula $SiX_nY_{4-n}$, wherein X is hydrogen, phenyl or an alkyl of 1 to 6 carbon atoms, Y is OR where R is an alkyl of 1 to 6 carbon atoms and wherein $n$ is O or 1, with a quantity of water less than the stoichiometric amount required for total hydrolysis of the alkoxide radicals in the presence of an effective catalytic amount of an acid hydrolysis catalyst so as to prepare a clear solution of a partially hydrolyzed silicon alkoxide;
  2. reacting said partially hydrolyzed silicon alkoxide with an aqueous solution of a metal compound which is convertible to a metal oxide below about 600°C. so as to form a clear solution of said glass precursor;
II. heating said glass precursor to a temperature and for a time sufficient to convert same to a silicate glass coating on said inorganic substrate.

15. The process of claim 14 wherein said metal compound is a metal salt of an organic acid.

16. A process for providing a silicate glass coated and protected inorganic substrate which comprises:
I. applying a clear solution having a pH of less than about 1.5 of a hydrolyzed glass precursor onto said substrate, said precursor being prepared by:
  1. combining a silicon alkoxide of the formula $SiX_nY_{4-n}$, wherein X is hydrogen, phenyl or an alkyl of 1 to 6 carbon atoms, Y is OR wherein R is an alkyl of 1 to 6 carbon atoms, and $n$ is O or 1 with a quantity of water less than the stoichiometric amount required for total hydrolysis of the alkoxide radicals in the presence of an effective catalytic amount of a mineral acid hydrolysis catalyst so as to form a clear solution of a partially hydrolyzed silicon alkoxide having residual OR groups,
  2. reacting said clear solution of a soluble, partially hydrolyzed silicon alkoxide with a metal alkoxide so as to form a clear solution of a soluble further hydrolyzable metallosiloxane, and
  3. reacting said clear solution of a soluble, further hydrolyzable metallosiloxane with an additional quantity of water, said additional quantity of water being sufficient to hydrolyze said further hydrolyzable metallosiloxane so as to form a clear solution,
II. heating said precursor to a temperature and for a time sufficient to convert same to a silicate glass coating on said inorganic substrate.

17. The process of claim 16 wherein at least part of said additional quantity of water is a water solution of a metal compound which decomposes to an oxide below about 600°C.

18. The process of claim 17 wherein said metal alkoxide is a compound of the formula $M(OR')_x$ wherein M represents a metal, R' represents an alkyl of 1 to 6 carbon atoms, and X is an integer equal to the valence of M.

19. The process of claim 17 wherein said metal alkoxide is a double metal alkoxide of the formula $M_1M_2(OR)_x$ wherein $M_1$ and $M_2$ are metals, R is an alkyl of 1 to 7 carbon atoms and X corresponds to the combined valences of $M_1$ and $M_2$.

20. The process of claim 16 wherein $n$ is O, the amount of water which is combined with said silicon alkoxide is about one equivalent per equivalent of silicon alkoxide, said combining being done in the presence of a $C_1$ to $C_6$ alcohol, and wherein said acid hydrolysis catalyst is present in an amount sufficient to provide a pH of between about 2.5 to about 5 and further including the step of adjusting the pH of the clear solution formed by said reacting of said clear solution of said further hydrolyzable metallosiloxane with an additional quantity of water to less than about 1.5.

21. A process for increasing the smoothness of the surface of an alumina substrate which comprises:
I. spraying a clear solution in a solvent of an alumina-compatible, hydrolyzed silicate-glass precursor onto said alumina substrate while at an elevated temperature, said precursor being prepared by
  1. reacting a silicon alkoxide of the formula $Si(OR)_4$, wherein R is an alkyl of 1 to 6 carbon atoms with about 0.3 to about 1.5 equivalents of water per equivalent of said silicon alkoxide at a pH of between about 2.5 to about 5 so as to prepare a clear solution of a partially hydrolyzed silicon alkoxide,
  2. combining said solution of a partially hydrolyzed silicon alkoxide with a metal alkoxide of the formula $M(OR')_x$, wherein M represents a metal, R' is an alkyl of 1 to 6 carbon atoms, and X is an integer equal to the valence of M, or of the formula $M_1M_2(OR)_x$, wherein $M_1$ and $M_2$ are metals, R is an alkyl of 1 to 6 carbon atoms and X is an integer equal to the combined valences of $M_1$ and $M_2$ and allowing said combined ingredients to react so as to form a clear solution of a soluble, further hydrolyzable metallosiloxane having residual OR and OR' groups,
  3. reacting said solution of a soluble metallosiloxane with a water solution of a metal compound which is convertible to a metal oxide, sufficient water being employed to react with said residual OR groups and OR' groups so as to obtain a clear solution,
  4. adjusting the pH of said latter solution to between about 0.5 to 1, wherein said elevated temperature and the rate of said spraying are so selected so that essentially no wetting of said alumina takes place and so that the solvent substantially evaporates upon contact with said alumina, leaving a deposit thereon of said glass precursor and
II. heating said precursor to a temperature and for a time sufficient to convert same to a smooth silicate glass coating on the alumina.

22. The process of claim 21 wherein said precursor is heated to form said silicate glass coating within a period of time of about 15 to about 90 seconds.

23. The process of claim 22 wherein said silicon alkoxide and water is reacted in the presence of ethanol and wherein said elevated temperature is between about 150°C. to about 300°C.

24. A process for providing a silicate glass-coated and protected inorganic substrate which comprises:
I. spraying a clear solution in a solvent of a hydrolyzed silicate glass precursor onto said substrate while said substrate is at an elevated temperature, said temperature and the spraying rate being so selected so as to essentially prevent wetting of the surface of said substrate and so that the solvent substantially evaporates upon contact with said substrate, leaving a deposit thereon of said silicate glass precursor, said precursor being prepared by 1. reacting a silicon alkoxide of the formula $Si(OR)_4$ wherein R is an alkyl of 1 to 6 carbon atoms with between about 0.3 to about 1.5 equivalents of water per equivalent of silicon alkoxide in the presence of an effective catalytic amount of an acid hydrolysis catalyst so as to prepare a clear solution of a partially hydrolyzed silicon alkoxide,
2. combining said solution of a partially hydrolyzed silicon alkoxide with a metal alkoxide of the formula $M(OR')_x$ wherein M represents a metal, R' is an alkyl of 1 to 6 carbon atoms, and x is an integer equal to the valence of M, or a compound of the formula $M_1M_2(OR)_x$, wherein $M_1$ and $M_2$ are metals, R is an alkyl of 1 to 6 carbon atoms, and x is an integer equal to the combined valences of $M_1$ and $M_2$, and allowing said combined ingredients to react so as to form a clear solution of a soluble, further-hydrolyzable metallosiloxane having residual alkoxy groups,
3. reacting said solution of a soluble metallosiloxane with an additional quantity of water, said additional quantity of water being sufficient to react with said residual alkoxy groups so as to obtain a clear solution, and wherein at least part of said additional water is a water solution of a metal salt which decomposes to an oxide below about 600° C., II. heating said deposit of said glass precursor to a temperature and for a time sufficient to convert same to a silicate glass coating on said substrate.

* * * * *

UNITED STATES PATENT OFFICE
CERTIFICATE OF CORRECTION

Patent No. 3,811,918        Dated May 21, 1974

Inventor(s) Leon Levene

It is certified that error appears in the above-identified patent and that said Letters Patent are hereby corrected as shown below:

Column 5, line 21, "aluminobrosilicate" should be -- aluminoborosilicate -- .

Column 7, lines 58, delete "following the"; line 61 after following insert -- the formation --.

Claim 12, (column 10, line 60) after about, delete "1.5" and substitute therefor -- 0.5 --.

Signed and Sealed this twenty-third Day of March 1976

[SEAL]

Attest:

RUTH C. MASON
Attesting Officer

C. MARSHALL DANN
Commissioner of Patents and Trademarks